US012780454B2

(12) United States Patent
Asano et al.

(10) Patent No.: US 12,780,454 B2
(45) Date of Patent: Nov. 3, 2026

(54) NAVIGATION ORBIT CALCULATION DEVICE, NAVIGATION ORBIT CALCULATION METHOD, AND RECORDING MEDIUM

(71) Applicant: Mitsubishi Electric Corporation, Tokyo (JP)

(72) Inventors: Yuta Asano, Tokyo (JP); Takehiro Nishiyama, Tokyo (JP); Akihiko Honda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 41 days.

(21) Appl. No.: 18/865,348

(22) PCT Filed: Jun. 13, 2022

(86) PCT No.: PCT/JP2022/023680
§ 371 (c)(1),
(2) Date: Nov. 13, 2024

(87) PCT Pub. No.: WO2023/242922
PCT Pub. Date: Dec. 21, 2023

(65) Prior Publication Data
US 2025/0304289 A1 Oct. 2, 2025

(51) Int. Cl.
*G07C 5/00* (2006.01)
*B64G 3/00* (2006.01)
(Continued)

(52) U.S. Cl.
CPC ............... *B64G 3/00* (2013.01); *G01C 21/02* (2013.01)

(58) Field of Classification Search
CPC ........... B64G 3/00; G01C 21/02; G01S 5/021; G01S 5/0269; G01S 5/0294; G01S 7/40; G01S 13/765; G01P 15/02; G01P 15/18
See application file for complete search history.

(56) References Cited

U.S. PATENT DOCUMENTS 12,024,314 B2 * 7/2024 Fasano ................. B64G 1/1078
12,163,764 B2 * 12/2024 Brewer ................... F41G 7/346
(Continued)

FOREIGN PATENT DOCUMENTS

EP 4 105 131 A1 12/2022
JP 2021-059190 A 4/2021
(Continued)

OTHER PUBLICATIONS

International Search Report and Written Opinion mailed on Jul. 26, 2022, received for International Application No. PCT/JP2022/023680, filed on Jun. 13, 2022, 8 pages including English Translation.

(Continued)

*Primary Examiner* — Kito R Robinson
*Assistant Examiner* — Anthony Gabriel Mora
(74) *Attorney, Agent, or Firm* — XSENSUS LLP

(57) ABSTRACT

A navigation orbit calculation device includes an observable region calculator and a navigation orbit calculator. The observable region calculator calculates an observable range observable by a sensor mounted on a spacecraft. The navigation orbit calculator calculates a navigation orbit that includes an observation start point included in the observable range calculated by the observable region calculator and an observation end point included in the observable range. A distance between the observation start point and an approaching target to be observed by the sensor is greater than a distance between the observation end point and the approaching target.

10 Claims, 5 Drawing Sheets

(51) Int. Cl.

| | |
|---|---|
| ***G01C 21/02*** | (2006.01) |
| ***G07C 5/02*** | (2006.01) |
| ***G07C 5/04*** | (2006.01) |
| ***G07C 5/08*** | (2006.01) |

(56) References Cited

U.S. PATENT DOCUMENTS

| | | | | |
|---|---|---|---|---|
| 2017/0041548 | A1* | 2/2017 | Robinson | H04N 23/685 |
| 2019/0389602 | A1* | 12/2019 | Schilling | B64G 1/26 |
| 2021/0163154 | A1* | 6/2021 | Kato | B23Q 17/2404 |
| 2022/0390605 | A1* | 12/2022 | Gigleux | B64G 1/1078 |

FOREIGN PATENT DOCUMENTS

| | | | |
|---|---|---|---|
| WO | 2021/089938 | A1 | 5/2021 |
| WO | 2021/200055 | A1 | 10/2021 |

OTHER PUBLICATIONS

Woffinden et al., “Observability Criteria for Angles-Only Navigation”, IEEE Transactions on Aerospace and Electronic Systems, vol. 45, No. 3, Jul. 2009, pp. 1194-1208.

Extended European Search Report issued Jun. 17, 2025 in European Patent Application No. 22946742.8, 8 pages.

Jaehwan PI, et al., “Trajectory Design for Improving Observability of Angles-Only Relative Navigation between Two Satellites”, Journal of the Astronautical Sciences, vol. 61, No. 4, Oct. 31, 2014, 22 pages, XP035587441.

* cited by examiner

NAVIGATION ORBIT CALCULATION DEVICE, NAVIGATION ORBIT CALCULATION METHOD, AND RECORDING MEDIUM

CROSS-REFERENCE TO RELATED APPLICATION

This application is a national stage application, pursuant to 35 U.S.C. § 371, of International Patent Application No. PCT/JP2022/023680, filed Jun. 13, 2022, the entire contents of which are incorporated herein by reference.

TECHNICAL FIELD

The present disclosure relates to a navigation orbit calculation device, a navigation orbit calculation method, and a program.

BACKGROUND ART

Patent Literature 1 discloses a position estimation system that includes an optical sensor and a controller installed in a spacecraft. The spacecraft continuously captures images in time series. The controller includes a boundary surface direction acquirer, a first time acquirer, a sight line angle acquirer that acquires an angle of a sight line from the spacecraft to a target at a first time, a second time acquirer, a spacecraft travel distance acquirer that acquires a travel distance of the spacecraft between the first time and a second time, and a first target relative position estimator that estimates a relative position of the target with respect to the spacecraft at the first time.

CITATION LIST

Patent Literature

Patent Literature 1: Unexamined Japanese Patent Application Publication No. 2021-59190

SUMMARY OF INVENTION

Technical Problem

In relative navigation performed by a vehicle using an optical sensor with respect to an object in space, in a case where the vehicle is distant from the object, mere information on a relative direction between the vehicle and the object can be obtained. This navigation is referred to as an Angles-Only Navigation (AON) and does not have observability in a case where relative movement with respect to the object follows linear dynamics. In a case where the navigation does not have observability, final errors depend on initial estimation errors and initial conditions, and estimation errors of a relative position and a velocity cannot be smaller than certain values even in long-time observation.

The device disclosed in Patent Literature 1 observes the vicinity of a boundary surface between a shade region and a sunlight region and estimates, based on a time of having arrived at a boundary, a relative position and a velocity of an approaching target. This method requires observation of the vicinity of the boundary surface and has a problem in that estimation cannot be made in a short time depending on an orbit altitude.

In view of the above problem, an objective of the present disclosure is to provide a navigation orbit calculation device, a navigation orbit calculation method, and a program that achieve a distance between an observation start point and an approaching target greater than a distance between an observation end point and the approaching target, and thereby allow estimation errors of a relative position and a velocity to be smaller without observation of the vicinity of a boundary surface between a shade region and a sunlight region.

Solution to Problem

To achieve the above objective, a navigation orbit calculation device according to the present disclosure includes an observable region calculator and a navigation orbit calculator. The observable region calculator calculates an observable range observable by a sensor mounted on a spacecraft. The navigation orbit calculator calculates a navigation orbit that includes an observation start point included in the observable range calculated by the observable region calculator and an observation end point included in the observable range. A distance between the observation start point and an approaching target to be observed by the sensor is greater than a distance between the observation end point and the approaching target.

Advantageous Effects of Invention

The present disclosure can provide a navigation orbit calculation device, a navigation orbit calculation method, and a program that achieve a distance between an observation start point and an approaching target greater than a distance between an observation end point and the approaching target, and thereby allow estimation errors of a relative position and a velocity to be smaller without observation of the vicinity of a boundary surface between a shade region and a sunlight region.

DESCRIPTION OF EMBODIMENTS

Embodiment 1

Figure 1:
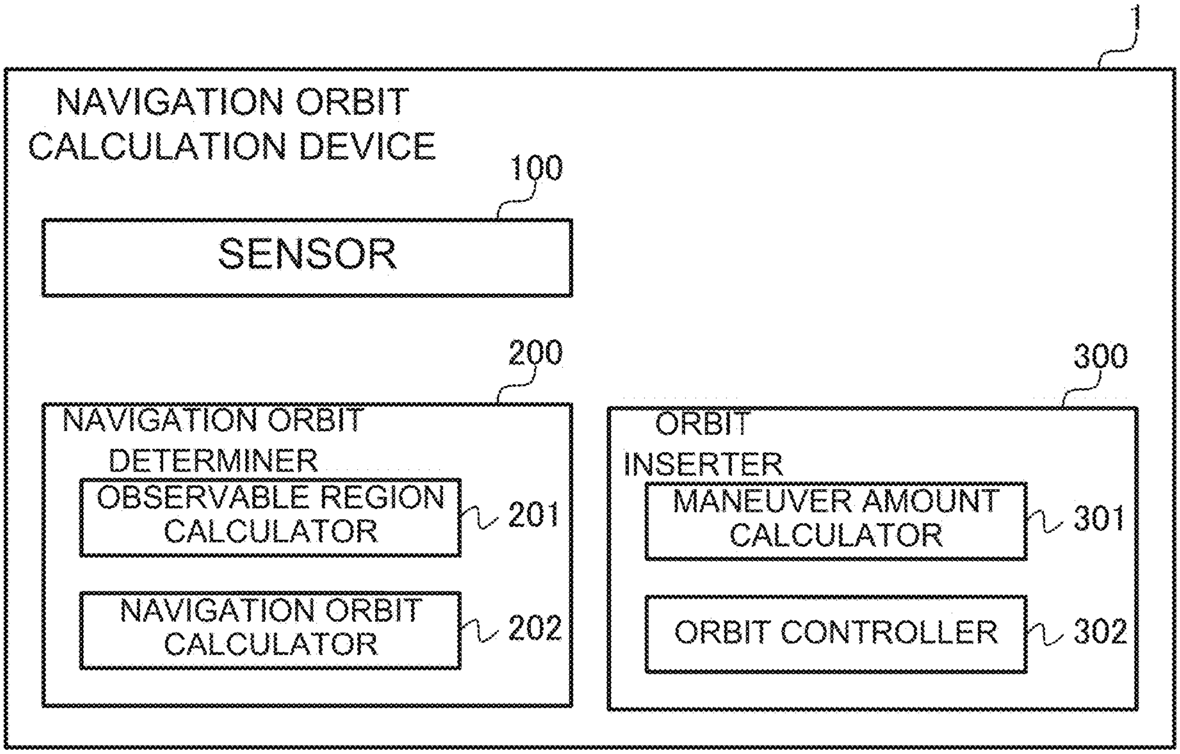
FIG. 1 is a block diagram illustrating configuration of a navigation orbit calculation device according to Embodiment 1.

A navigation orbit calculation device 1 according to Embodiment 1 of the present disclosure is described with reference to FIGS. 1 to 7. The same reference signs denote the same or corresponding components in the drawings. The navigation orbit calculation device 1 according to the embodiment is a device that is mounted on a spacecraft and calculates a navigation orbit O of the spacecraft to control the spacecraft.

FIG. 1 is a block diagram illustrating configuration of the navigation orbit calculation device 1 according to Embodiment 1. As illustrated in FIG. 1, the navigation orbit calculation device 1 includes a sensor 100 that observes an approaching target 3, a navigation orbit determiner 200 that determines the navigation orbit O of the spacecraft based on an observable region R observable by the sensor 100, and an orbit inserter 300 that inserts the spacecraft into the navigation orbit O determined by the navigation orbit determiner 200.

The sensor 100 is a device that is mounted on the spacecraft and observes the approaching target 3 to measure a relative position between the spacecraft and the approaching target 3. Examples of the sensor 100 may include an optical camera, but the sensor 100 is not limited thereto.

The navigation orbit determiner 200 determines the navigation orbit O of the spacecraft based on the observable region R observable by the sensor 100. The navigation orbit determiner 200 includes an observable region calculator 201 that calculates the observable region R being a region in which the approaching target 3 is observable, and a navigation orbit calculator 202 that calculates the navigation orbit O of the spacecraft.

The observable region calculator 201 calculates, based on a minimum observation distance Lmin and a maximum observation distance Lmax of the approaching target 3 and a positional relationship between the approaching target 3 and the sun S, the observable region R being a region in which the approaching target 3 is observable. Specifically, the observable region calculator 201 calculates, as the observable region R, a region that is centered on the approaching target 3, has a distance from the approaching target 3 being the minimum observation distance Lmin or more and the maximum observation distance Lmax or less, and is not a backlighted region B.

The approaching target 3 is a target to be approached by the spacecraft with the navigation orbit calculation device 1. Examples of the approaching target 3 may include a spacecraft such as an artificial satellite, an asteroid, and a space debris, but the approaching target 3 is not limited thereto.

Figure 2:
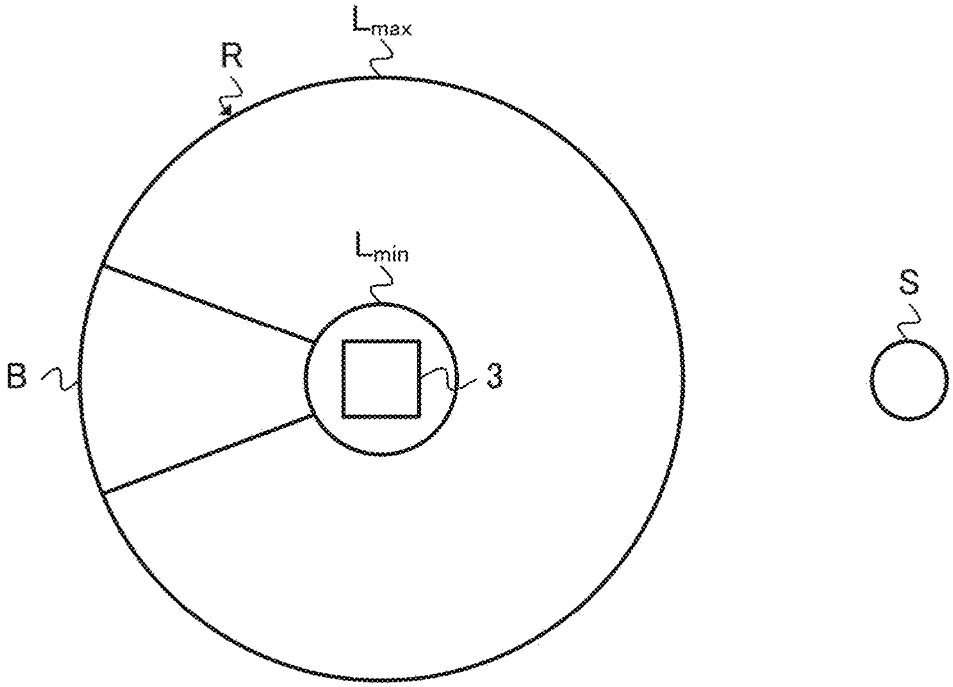
FIG. 2 illustrates an observable region calculated by an observable region calculator in Embodiment 1.

FIG. 2 illustrates the observable region R calculated by the observable region calculator 201 of the navigation orbit calculation device according to Embodiment 1. In FIG. 2, boundary surfaces of the observable region R with the minimum observation distance Lmin and the maximum observation distance Lmax are spherical surfaces and are expressed by sections thereof. However, these boundary surfaces are not limited to spherical surfaces and may have any shapes.

The observable region calculator 201 determines the minimum observation distance Lmin based on an approachable distance sufficient to avoid collision with the approaching target 3, an initial estimated position error, and a safety factor. In a case where the approaching target 3 is a cooperative object, the observable region calculator 201 downlinks global positioning system (GPS) positioning information of the approaching target 3 to determine the initial estimated position error. In a case where the approaching target 3 is an uncooperative object, the observable region calculator 201 determines the initial estimated position error based on a result of observation using a telescope or a radar on the ground.

The observable region calculator 201 determines the maximum observation distance Lmax based on performance of the sensor 100 and a relative position relationship between the sensor 100 and the sun S. Specifically, the observable region calculator 201 determines the maximum observation distance Lmax as a distance at which intensity of light sufficient for the sensor 100 to extract the approaching target 3 as a light spot can be obtained.

Direct observation of the sun S using the sensor 100 may cause failure of an imaging element included in the sensor 100. To avoid such failure, the observable region calculator 201 excludes, from the observable region R, a region that is backlighted, that is, the backlighted region B. The range of the backlighted region B depends on a viewing angle of the sensor 100.

The navigation orbit calculator 202 calculates the navigation orbit O of the spacecraft based on information on the observable region R calculated by the observable region calculator 201.

Figure 3:
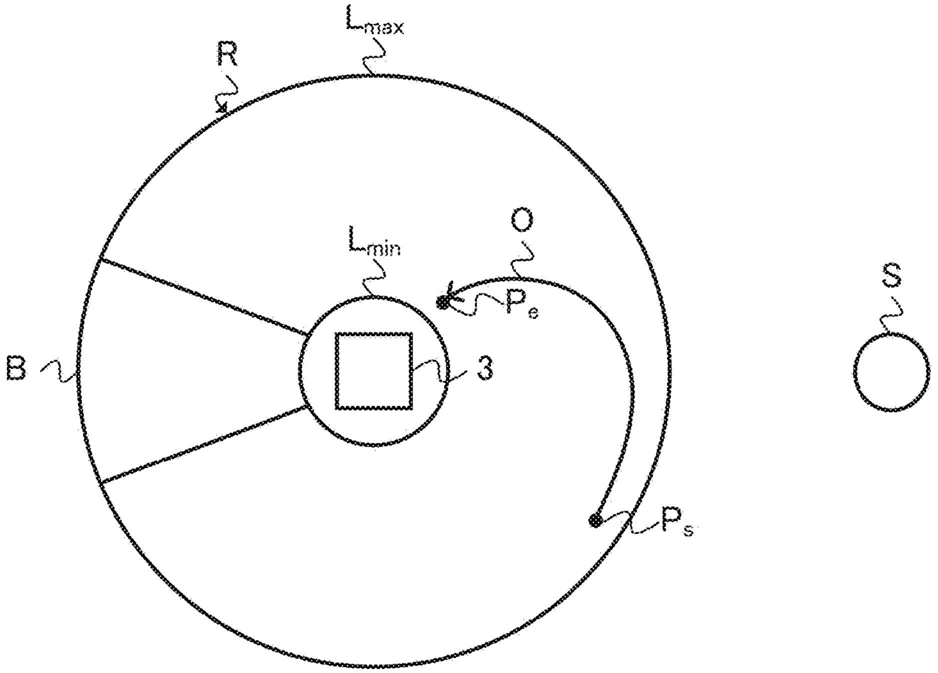
FIG. 3 illustrates a navigation orbit calculated by a navigation orbit calculator in Embodiment 1.

FIG. 3 illustrates the navigation orbit O calculated by the navigation orbit calculator 202. The position of the spacecraft at an observation start time is an observation start point Ps, and the position of the spacecraft at an observation end time is an observation end point Pe. As illustrated in FIG. 3, the navigation orbit calculator 202 calculates the navigation orbit O in which the observable region R includes at least the positions of the spacecraft at the observation start time and at the observation end time and the distance between the approaching target 3 and the spacecraft at the observation end time is less than the distance between the approaching target 3 and the spacecraft at the observation start time.

Figure 4:
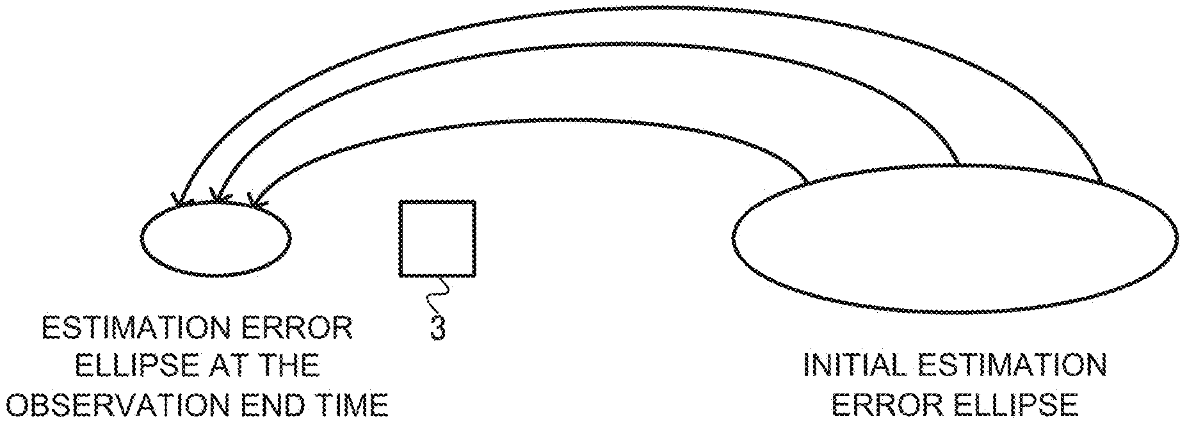
FIG. 4 illustrates an example of an initial estimation error and an estimation error at an observation end time in Embodiment 1.

FIG. 4 illustrates an example of an initial estimation error and an estimation error at the observation end time. As illustrated in FIG. 4, the position of the spacecraft at the observation start time has the initial estimation error expressed by an initial estimation error ellipse. Similarly, the position of the spacecraft at the observation end time has the estimation error expressed by an estimation error ellipse at the observation end time. The navigation orbit calculator 202 calculates the navigation orbit O in which the distance between the approaching target 3 and the spacecraft decreases. This allows the estimation error at the observation end time to be smaller.

Figure 5:
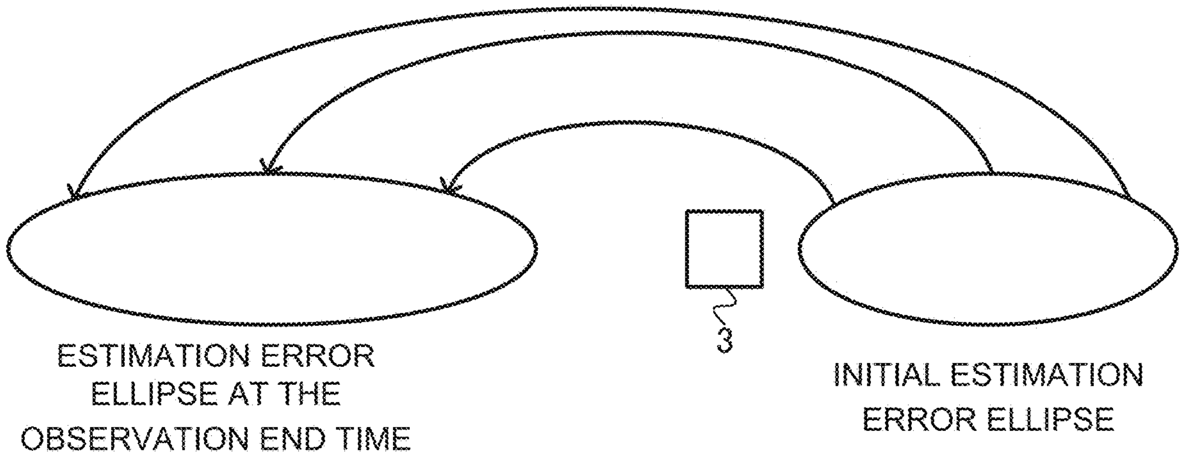
FIG. 5 illustrates another example of the initial estimation error and the estimation error at the observation end time in Embodiment 1.

FIG. 5 illustrates another example of the initial estimation error and the estimation error at the observation end time. In the example of FIG. 5, the navigation orbit calculator 202 calculates the navigation orbit O in which the distance between the approaching target 3 and the spacecraft at the observation end time is greater than the distance between the approaching target 3 and the spacecraft at the observation start time. As illustrated in FIG. 5, when the navigation orbit calculator 202 calculates the navigation orbit O in which the distance between the approaching target 3 and the spacecraft increases, the estimation error in a relative direction at the observation end time becomes larger. As illustrated in FIGS. 4 and 5, the estimation error in the relative direction depends strongly on a relative distance between the approaching target 3 and the spacecraft, rather than on an observation period.

A specific method is described in which the navigation orbit calculator 202 calculates the navigation orbit O. The navigation orbit calculator 202 defines the observation start point Ps as a point that is located in the observable region R and on a spherical surface having a fixed distance from the approaching target 3, and defines the observation end point Pe as a point that is located in the observable region R and on another spherical surface having a fixed distance from the approaching target 3. At this time, the distance between the approaching target 3 and the spacecraft at the observation end time is less than the distance between the approaching target 3 and the spacecraft at the observation start time.

The navigation orbit calculator 202 defines the observation start point Ps as an intersection point between the spherical surface at the observation start time and a line segment connecting the approaching target 3 and the sun S, and defines the observation end point Pe as an intersection point between the spherical surface at the observation end time and the line segment, so as to allow the sensor 100 to perform observation with the back thereof to the sun S.

The navigation orbit calculator 202 solves a two-point boundary value problem to calculate a velocity of the spacecraft at the observation start point Ps and a velocity of the spacecraft at the observation end point Pe, and calculates an orbit connecting these velocities as the navigation orbit O.

The orbit inserter 300 controls the spacecraft to be inserted into the navigation orbit O determined by the navigation orbit determiner 200. The orbit inserter 300 includes a maneuver amount calculator 301 that calculates a maneuver amount sufficient to insert the spacecraft into the navigation orbit O, and an orbit controller 302 that achieves the maneuver amount and controls the orbit of the spacecraft.

The maneuver amount calculator 301 calculates the maneuver amount sufficient to insert the spacecraft into the navigation orbit O. As an example, a method is described in which the maneuver amount calculator 301 calculates the maneuver amount in a case where the spacecraft performs orbit transition in two impulses.

Figure 6:
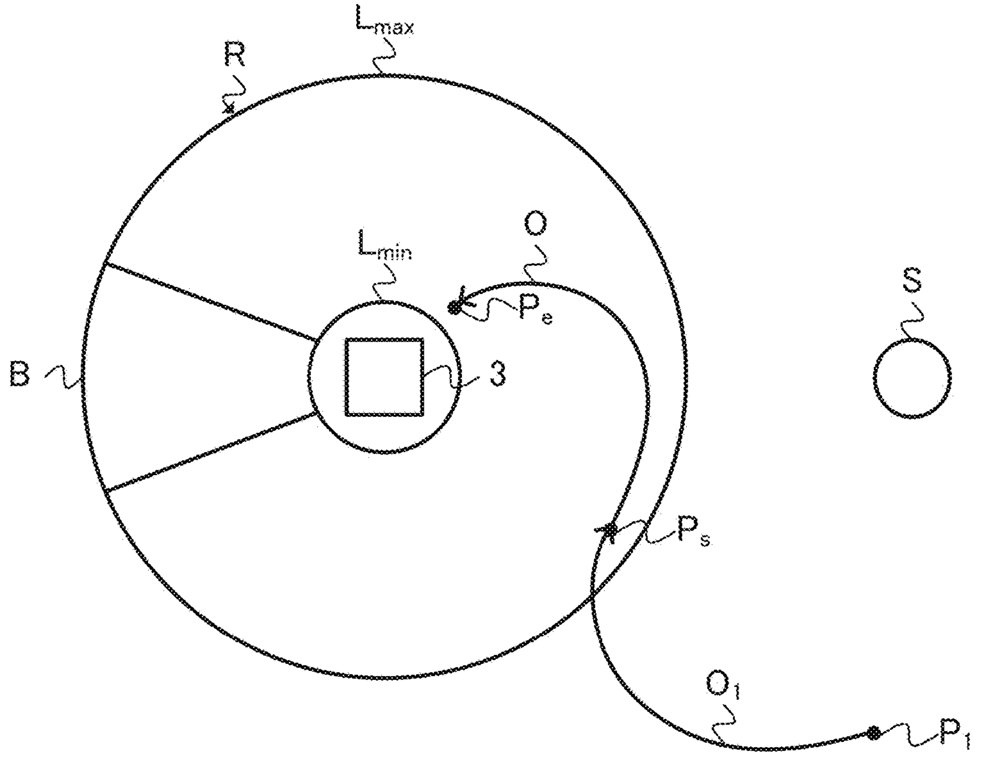
FIG. 6 illustrates a transition start point, an observation start point, and a transition orbit in Embodiment 1.

FIG. 6 illustrates a transition start point P1, the observation start point Ps, and a transition orbit O1. As illustrated in FIG. 6, the transition orbit O1 connecting the transition start point P1 and the observation start point Ps follows natural dynamics. The maneuver amount calculator 301 solves the two-point boundary value problem to calculate a velocity of the spacecraft at the transition start point P1 and the velocity of the spacecraft at the observation start point Ps, and calculates an orbit connecting these velocities as the transition orbit O1. The maneuver amount calculator 301 calculates, as a first maneuver amount, a difference between a velocity before the start of transition and a velocity immediately after the start of transition, and calculates, as a second maneuver amount, a difference between a velocity at the end of transition and a velocity at the start of observation.

The orbit controller 302 achieves the maneuver amount calculated by the maneuver amount calculator 301, and controls the orbit of the spacecraft. The orbit controller 302 calculates, based on the attitude of the spacecraft and the arrangement of thrusters included in the spacecraft, a jetting volume of each thruster, controls the thrusters to perform jetting at the calculated jetting volume, achieves the maneuver amount calculated by the maneuver amount calculator 301, and controls the orbit of the spacecraft. As a specific method for calculating the jetting volume of the thrusters, the maneuver amount calculator 301 may solve a linear programming problem, but the method is not limited thereto.

Figure 7:
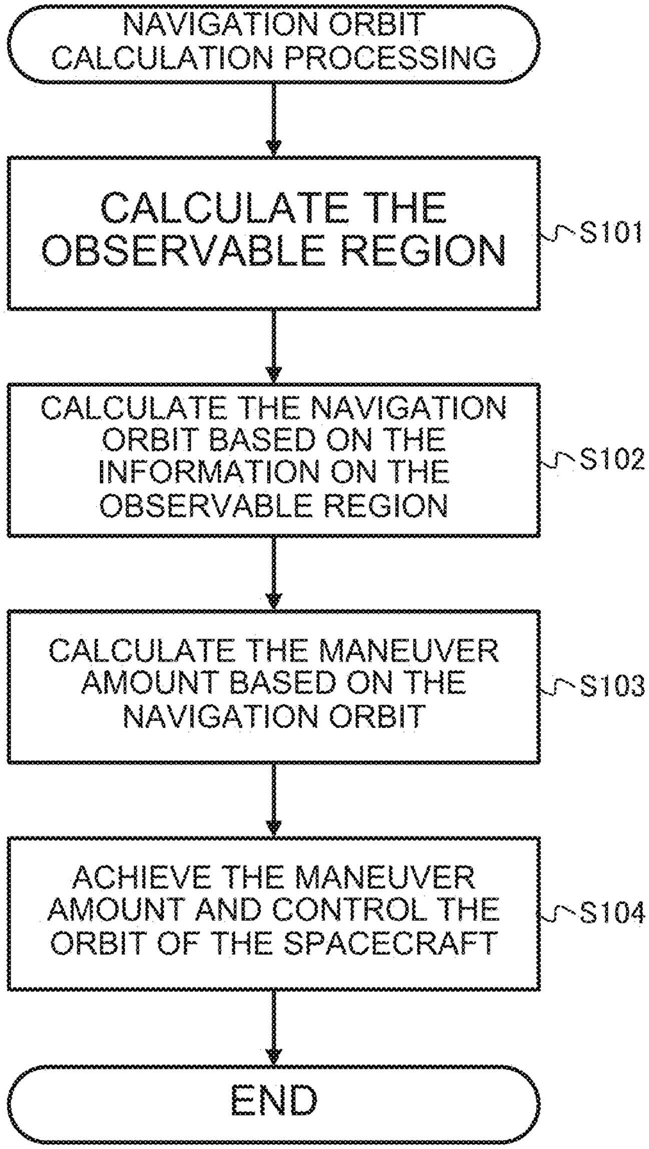
FIG. 7 is a flowchart illustrating navigation orbit calculation processing executed by the navigation orbit calculation device according to Embodiment 1.

FIG. 7 is a flowchart illustrating navigation orbit calculation processing executed by the navigation orbit calculation device 1 according to Embodiment 1. The navigation orbit calculation processing is described with reference to the flowchart in FIG. 7.

When the navigation orbit calculation processing starts, the observable region calculator 201 of the navigation orbit calculation device 1 calculates the observable region R based on the minimum observation distance Lmin and the maximum observation distance Lmax of the approaching target 3 and the positional relationship between the approaching target 3 and the sun S (Step S101).

After the observable region calculator 201 calculates the observable region R, the navigation orbit calculator 202 calculates the navigation orbit O based on the information on the observable region R calculated by the observable region calculator 201 (Step S102).

After the navigation orbit calculator 202 calculates the navigation orbit O, the maneuver amount calculator 301 calculates the maneuver amount based on the navigation orbit O calculated by the navigation orbit calculator 202 (Step S103).

After the maneuver amount calculator 301 calculates the maneuver amount, the orbit controller 302 achieves the maneuver amount calculated by the maneuver amount calculator 301, controls the orbit of the spacecraft (Step S104), and ends the navigation orbit calculation processing.

Through the navigation orbit calculation processing, the navigation orbit calculation device 1 according to Embodiment 1 with the above configuration can achieve the distance between the observation start point Ps and the approaching target 3 greater than the distance between the observation end point Pe and the approaching target 3, and reduce estimation errors of a relative position and a velocity without observation of the vicinity of a boundary surface between a shade region and a sunlight region, that is, without observation during a period including a time at which the approaching target 3 passes through the boundary surface between the shade region and the sunlight region.

Embodiment 2

The navigation orbit calculation device 1 according to Embodiment 2 of the present disclosure is described. The navigation orbit calculation device 1 according to Embodiment 2 determines the observation start point Ps and the observation end point Pe on the boundary surfaces of the observable region R.

The navigation orbit calculator 202 of the navigation orbit calculation device 1 according to Embodiment 2 defines the observation start point Ps as a point that is located on the outer boundary surface of the observable region R and has a maximum distance from the approaching target 3. The navigation orbit calculator 202 defines the observation end point Pe as a point that is located on the inner spherical surface of the observable region R and has a minimum distance from the approaching target 3.

Through the navigation orbit calculation processing, the navigation orbit calculation device 1 according to Embodiment 2 with the above configuration achieves the same effects as the navigation orbit calculation device 1 according to Embodiment 1.

The navigation orbit calculation device 1 according to Embodiment 2 defines the observation start point Ps as a point that has a maximum distance from the approaching target 3 and defines the observation end point Pe as a point that has a minimum distance from the approaching target 3, and thereby can increase a ratio of the relative distance at the observation start time to the relative distance at the observation end time. This allows errors of the relative position and the velocity at the observation end time to be smaller.

Embodiment 3

The navigation orbit calculation device 1 according to Embodiment 3 of the present disclosure is described with reference to FIG. 8. The navigation orbit calculation device 1 according to Embodiment 3 determines the observation start point Ps based on an eigenvector direction corresponding to the short axis of the initial estimation error ellipse at the observation start time.

The navigation orbit calculator 202 of the navigation orbit calculation device 1 according to Embodiment 3 determines the observation start point Ps based on a direction of an eigenvector corresponding to the short axis of the initial estimation error ellipse at the observation start time. The short axis of the initial estimation error ellipse is expressed by an eigenvector with a minimum eigenvalue of an error covariance matrix. The navigation orbit calculator 202 determines the observation start point Ps on a straight line that passes through the position of the approaching target 3 at the observation start time and is parallel to the eigenvector corresponding to the short axis of the initial estimation error ellipse.

Figure 8:
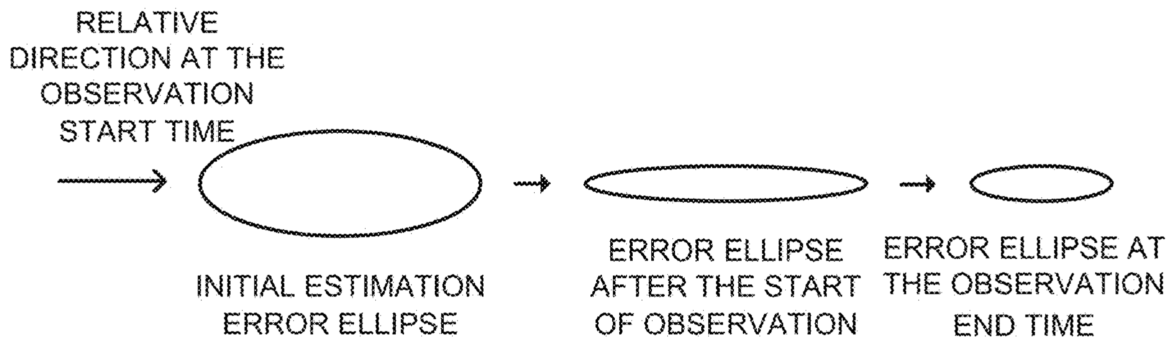
FIG. 8 illustrates an example of an initial estimation error, an error after the start of observation, and an error after the end of observation in Embodiment 3.

FIG. 8 illustrates an example of the initial estimation error, an error after the start of observation, and an error after the end of observation. FIG. 8 illustrates an example of a case where the observation start point Ps is determined based on a direction of an eigenvector corresponding to the long axis of the initial estimation error ellipse at the observation start time. The relative direction indicates a direction of a straight line connecting the spacecraft and the approaching target 3. As illustrated in FIG. 8, a component of an error ellipse perpendicular to the relative direction at the observation start time decreases after the start of observation. In contrast, a component parallel to the relative direction does not decrease immediately after the start of observation. Although the reduced distance between the spacecraft and the approaching target 3 at the observation end time allows the error ellipse to be smaller, the error ellipse after the start of observation has a large diameter in a direction parallel to the relative direction, and the final error ellipse is larger than that in a case where observation starts from other orientations.

Figure 9:
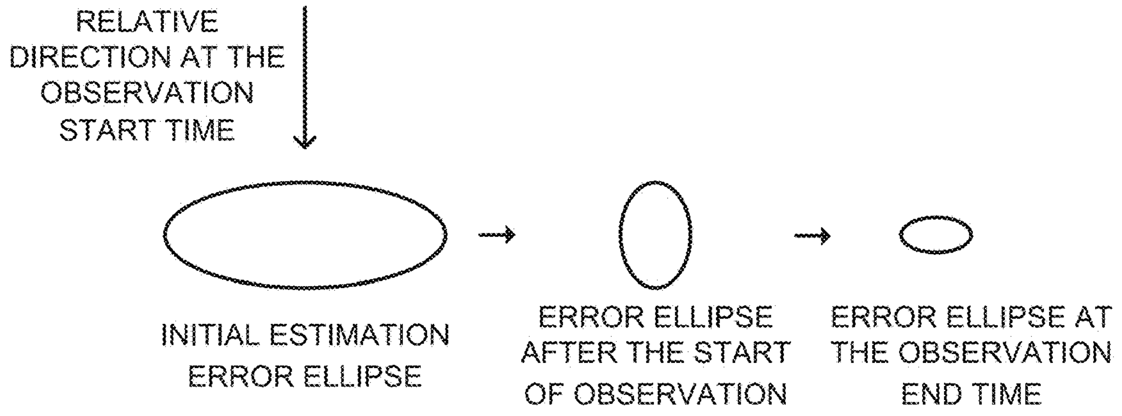
FIG. 9 illustrates another example of the initial estimation error, the error after the start of observation, and the error after the end of observation in Embodiment 3.

FIG. 9 illustrates another example of the initial estimation error, the error after the start of observation, and the error after the end of observation. FIG. 9 illustrates an example of a case where the observation start point Ps is determined based on a direction of an eigenvector corresponding to a minimum eigenvalue of the initial estimation error ellipse at the observation start time. As illustrated in FIG. 9, the component of the error ellipse perpendicular to the relative direction at the observation start time, that is, the long-axis component of the error ellipse decreases after the start of observation. The reduced distance between the spacecraft and the approaching target 3 at the observation end time allows the short-axis component of the error ellipse to be smaller.

Through the navigation orbit calculation processing, the navigation orbit calculation device 1 according to Embodiment 3 with the above configuration achieves the same effects as the navigation orbit calculation device 1 according to Embodiment 1.

The navigation orbit calculation device 1 according to Embodiment 3 determines the observation start point Ps based on the eigenvector direction corresponding to the minimum eigenvalue of the initial estimation error ellipse at the observation start time. This allows the long-axis component of the estimation error ellipse to be smaller after the start of observation. This allows the errors of the relative position and the velocity at the observation end time to be smaller.

Embodiment 4

The navigation orbit calculation device 1 according to Embodiment 4 of the present disclosure is described. The navigation orbit calculation device 1 according to Embodiment 4 calculates the navigation orbit O in which the velocity of the spacecraft at the observation end point Pe is perpendicular to the straight line connecting the spacecraft and the approaching target 3, that is, a straight line directed in the relative direction.

The navigation orbit calculator 202 of the navigation orbit calculation device 1 according to Embodiment 4 defines the observation end point Pe as a point that is located in the observable region R and on a spherical surface having a fixed distance from the approaching target 3, and solves the two-point boundary value problem under a condition in which the velocity of the spacecraft at the observation end point Pe is perpendicular to the relative direction, to calculate the velocity of the spacecraft at the observation end point Pe.

Through the navigation orbit calculation processing, the navigation orbit calculation device 1 according to Embodiment 4 with the above configuration achieves the same effects as the navigation orbit calculation device 1 according to Embodiment 1.

In a case where the spacecraft has a velocity parallel to the relative direction at the observation end point Pe, the spacecraft may further approach the approaching target 3 and collide therewith after the end of observation. The distance between the observation end point Pe and the approaching target 3 increased to avoid collision deteriorates estimation accuracy. A maneuver performed after the end of observation to avoid collision may shorten the life of the spacecraft.

The navigation orbit calculation device 1 according to Embodiment 4 calculates the navigation orbit O in which the velocity of the spacecraft at the observation end point Pe is perpendicular to the relative direction. This enables avoiding collision between the spacecraft and the approaching target 3 without shortening the life of the spacecraft.

Embodiment 5

The navigation orbit calculation device 1 according to Embodiment 5 of the present disclosure is described with reference to FIG. 10. The navigation orbit calculation device 1 according to Embodiment 5 calculates the navigation orbit O that includes one or more maneuvers between the observation start point Ps and the observation end point Pe.

Figure 10:
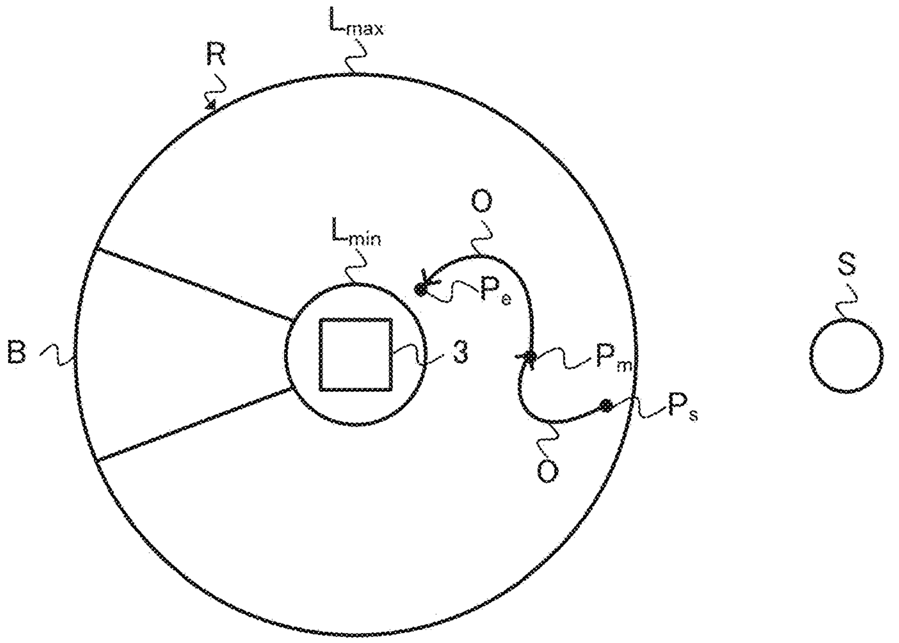
FIG. 10 illustrates an observation start point, a maneuver point, and an observation end point in Embodiment 5.

FIG. 10 illustrates the observation start point Ps, a maneuver point Pm, and the observation end point Pe. As illustrated in FIG. 10, the navigation orbit calculation device 1 according to Embodiment 5 calculates the navigation orbit O that includes one or more maneuvers between the observation start point Ps and the observation end point Pe. The calculator 1 calculates the navigation orbit O that includes maneuver points at which maneuvers are performed.

The navigation orbit calculator 202 calculates the navigation orbit O that includes one or more maneuver points. The maneuver amount calculator 301 calculates the maneuver amount at each maneuver point.

Through the navigation orbit calculation processing, the navigation orbit calculation device 1 according to Embodiment 5 with the above configuration achieves the same effects as the navigation orbit calculation device 1 according to Embodiment 1.

In a case where a light point different from the approaching target 3 is located in an orientation near the approaching target 3, or in a case where reflection of sunlight occurs, the approaching target 3 may be lost during navigation or be undistinguishable from the different light point. To avoid this difficulty, the navigation orbit O may be selected in which the approaching target 3 and the different light point do not overlap, or another orbit may be selected in which observation is performed with the own back to the sun S. However, a positional relationship among the approaching target 3, the different light point, and the sun S momentarily varies, and design of the navigation orbit O may be thus difficult solely based on natural dynamics.

The navigation orbit calculation device 1 according to Embodiment 5 calculates the navigation orbit O that includes one or more maneuvers between the observation start point Ps and the observation end point Pe. This enables avoiding the approaching target 3 from being lost or being undistinguishable from a light point different therefrom even in a case where design of the navigation orbit O is difficult solely based on natural dynamics.

The navigation orbit calculation device 1 according to Embodiment 5 performs maneuvers, and thereby allows an AON to have observability and improves estimation accuracy for the relative position and the velocity.

Modifications

Although the navigation orbit calculation device 1 is mounted on the spacecraft, the present disclosure is not limited thereto. The navigation orbit calculation device 1 may be arranged outside the spacecraft, communicate with the spacecraft to calculate the navigation orbit, and remotely control the spacecraft to be inserted into the navigation orbit.

Although an end point of the transition orbit O1 matches the observation start point Ps in FIG. 6, the present disclosure is not limited thereto. The end point of the transition orbit O1 may be different from the observation start point Ps.

Although the observable region calculator 201 calculates the observable region R based on the positional relationship between the approaching target 3 and the sun S, the present disclosure is not limited thereto. Examples of the luminous object described as the sun S in the above embodiments may include any fixed stars other than the sun or any planets.

Two or more of the above embodiments may be combined. For example, in a combination of Embodiments 2 and 3, the navigation orbit calculation device 1 may determine the observation start point Ps and the observation end point Pe on the boundary surfaces of the observable region R and determine the observation start point Ps based on the eigenvector direction corresponding to the short axis of the initial estimation error ellipse at the observation start time. The same applies to any other combinations of the embodiments.

Means and a method for performing various processes of the navigation orbit calculation device according to Embodiments 1 to 5 are also implementable by a dedicated hardware circuit or a programmed computer. The above program may be provided by a non-transitory computer-readable recording medium including a flexible disk or a compact disc read-only memory (CD-ROM) or provided on-line through a network including the Internet. In this case, the program recorded in the non-transitory computer-readable recording medium is typically transmitted to a storage including a hard disk and stored into the storage. The program may be provided as a single piece of application software or incorporated in software of an apparatus to serve as a function of the apparatus.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is applicable to a navigation orbit calculation device, a navigation orbit calculation method, and a program.

REFERENCE SIGNS LIST

1 Navigation orbit calculation device
3 Approaching target
100 Sensor
200 Navigation orbit determiner
201 Observable region calculator
202 Navigation orbit calculator
300 Orbit inserter
301 Maneuver amount calculator
302 Orbit controller
B Backlighted region
Lmax Maximum observation distance
Lmin Minimum observation distance
O Navigation orbit
O1 Transition orbit
P1 Transition start point
Pe Observation end point
Pm Maneuver point
Ps Observation start point
R Observable region
S Sun

The invention claimed is:

1. A navigation orbit calculation device, comprising:
processing circuitry to
calculate an observable range observable by a sensor mounted on a spacecraft,
calculate a navigation orbit including an observation start point included in the observable range and an observation end point included in the observable range, and
control the spacecraft based on the navigation orbit, wherein
a distance between the observation start point and an approaching target to be observed by the sensor is greater than a distance between the observation end point and the approaching target, and
the navigation orbit includes one or more maneuver points each indicating a position at which the spacecraft performs a maneuver.

2. The navigation orbit calculation device according to claim 1, wherein the processing circuitry calculates the navigation orbit in which the distance between the observation start point and the approaching target is maximum in the observable range and the distance between the observation end point and the approaching target is minimum in the observable range.

3. The navigation orbit calculation device according to claim 1, wherein the processing circuitry calculates the navigation orbit including the observation start point on a straight line, the straight line passing through a position of the approaching target and being parallel to an eigenvector corresponding to a minimum eigenvalue of an error covariance matrix at the position of the approaching target at an observation start time.

4. The navigation orbit calculation device according to claim 1, wherein the processing circuitry calculates the navigation orbit in which a direction of a velocity of the spacecraft at the observation end point is perpendicular to a straight line passing through the observation end point and the approaching target.

5. A navigation orbit calculation method, comprising:

calculating an observable range observable by a sensor mounted on a spacecraft to observe an approaching target;

calculating a navigation orbit including an observation start point included in the calculated observable range and an observation end point included in the observable range, and controlling the spacecraft based on the navigation orbit, wherein a distance between the observation start point and the approaching target is greater than a distance between the observation end point and the approaching target, and the navigation orbit includes one or more maneuver points each indicating a position at which the spacecraft performs a maneuver.

6. A non-transitory recording medium storing a program to cause a computer to perform operations comprising:

calculating an observable range observable by a sensor mounted on a spacecraft to observe an approaching target;

calculating a navigation orbit including an observation start point included in the calculated observable range and an observation end point included in the observable range, and controlling the spacecraft based on the navigation orbit, wherein a distance between the observation start point and the approaching target is greater than a distance between the observation end point and the approaching target, and the navigation orbit includes one or more maneuver points each indicating a position at which the spacecraft performs a maneuver.

7. The navigation orbit calculation device according to claim 2, wherein the processing circuitry calculates the navigation orbit including the observation start point on a straight line, the straight line passing through a position of the approaching target and being parallel to an eigenvector corresponding to a minimum eigenvalue of an error covariance matrix at the position of the approaching target at an observation start time.

8. The navigation orbit calculation device according to claim 2, wherein the processing circuitry calculates the navigation orbit in which a direction of a velocity of the spacecraft at the observation end point is perpendicular to a straight line passing through the observation end point and the approaching target.

9. The navigation orbit calculation device according to claim 3, wherein the processing circuitry calculates the navigation orbit in which a direction of a velocity of the spacecraft at the observation end point is perpendicular to a straight line passing through the observation end point and the approaching target.

10. The navigation orbit calculation device according to claim 7, wherein the processing circuitry calculates the navigation orbit in which a direction of a velocity of the spacecraft at the observation end point is perpendicular to a straight line passing through the observation end point and the approaching target.

* * * * *